Patented Jan. 16, 1951

2,538,516

UNITED STATES PATENT OFFICE 2,538,516

NITROPARAFFIN FUEL

John A. Hannum, Detroit, Mich., assignor, by mesne assignments, to Borg-Warner Corporation, Chicago, Ill., a corporation of Illinois No Drawing. Application September 12, 1945, Serial No. 615,917

4 Claims. (Cl. 52—1)

This invention, in common with that of my copending application Serial No. 687,213, filed July 30, 1946, for a "Nitroparaffin Fuel," relates to a propellant in the form of a combustible fuel for a prime mover in which a part, if not all, of the oxygen required for combustion of the fuel is contained at normal pressures and temperatures in far more concentrated form than is found in previously known liquid and gaseous fuel mixtures. More particularly it relates to such a propellant to which a mechanical or physical inhibitor has been added to decrease the violence of the reaction occurring and the flame temperature resulting when combustion of the fuel takes place.

In the development of prime mover fuels and propellants (the fuel and oxygen source considered together) certain researches have placed emphasis on the development of a self sufficient or nearly self sufficient propellant. By self sufficient is meant a combination of fuel with sufficient oxygen to permit complete combustion of the fuel without the addition of more oxygen from another source. Certain propellants of this type tend to burn with flame temperatures that are excessively high for the intended use; also they tend to detonate rapidly and have too high a rate of flame propagation for such uses.

A use of this kind of such a propellant is found in the gas turbine. Here the mechanical limitations of turbines and the materials from which they are made place definite limits on the aforementioned propellant characteristics. This is particularly true if it is desired to provide for a turbine a propellant that is self sufficient or nearly self sufficient in oxygen in order to eliminate the air compressor now used with gas turbines.

Gas turbines have become well known in the prime mover field, but heretofore have been subject to a marked disadvantage in that it has been necessary to provide a compressor as an integral part of the unit in order that the requisite amount of oxygen might be made available for combustion of the fuel. Such a compressor is employed to compress a large volume of air at atmospheric (sea level or high altitudes) volume and pressure to a greatly decreased volume with consequent pressure increase. The necessity of supplying this auxiliary unit has resulted in gas turbines having greater volume and more weight than is desirable for many purposes. This is particularly true in the adaptation of gas turbines as a source of power to drive aircraft.

Gas turbines, as now built, have also been subject to a marked disadvantage at the time they are started in rotation. Like other types of prime movers, they are not self-starting. However, in the case of such a turbine, the auxiliary power required to place the unit in rotation to perform work is much greater than, for example, with an Otto cycle internal combustion engine. In the case of a gas turbine, power in an amount approximating thirty per cent of the output of the unit is required to place the same in operation.

Even after a gas turbine of the presently known type is in operation at its normal working efficiency there is a marked disadvantage to its use. If the entire output of the turbine be considered as one hundred per cent, it is very possible that under certain types of use only ten per cent of this output will be devoted to performing work, namely to accomplish the function for which the turbine is intended. The balance of the output of the unit is required to compress from atmospheric pressure the air that is required for combustion of the fuel which drives the turbine.

It has been recognized that if a gas turbine could be provided with a suitable fuel which eliminated the foregoing disadvantages, its field of application would be considerably broadened. Fields in which it now has utility would be expanded and other fields in which its use is not now practical would be opened. At the present time gas turbines have found some use as stationary auxiliary equipment in power plants have been considered for use in driving railway locomotives. In addition to ground uses of this kind, gas turbines are used as a prime mover in jet propelled aircraft. All of these uses would be expanded if the foregoing objections to the gas turbine as it now stands and to the fuel available for its use could be eliminated.

The use of gas turbines to drive jet propelled aircraft with oxygen received from the atmosphere subjects the aircraft to a very marked ceiling limitation. As an aircraft rises higher and higher from the surface of the ground, the amount of oxygen in the surrounding atmosphere available for combustion of the fuel becomes more limited. This fact, together with the requirement for compression of the air, even at ground levels, to supply the requisite oxygen, is a definite limiting factor to the ceiling available with aircraft using this type of propulsion.

If it were possible to provide a propellant for driving gas turbines or for similar uses which in itself contained all, or a required major part, of the necessary materials for combustion, the necessity for relying on the supply of air from the surrounding atmosphere would be eliminated or greatly decreased. In effect this would make possible flight into the stratosphere and beyond because the propelling unit carried within itself both the fuel and the oxygen necessary for its combustion.

I have invented a propellant to meet the needs outlined above that consists of a mixture of a fuel such as nitromethane, a concentrated oxidizing agent in which the oxygen for combustion is in combined form, e. g., tetranitromethane and a mechanical or physical inhibitor to control the combustion. It is to be made clear that such a propellant is not limited in its use to gas turbine propulsion. Although even without inhibitors, such propellants have been found to be eminently satisfactory for some purposes and under certain conditions, in the present propellant I prefer to use a mechanical or physical, as distinguished from a chemical, inhibitor.

Generally the present invention is concerned with reducing the flame temperature, rate of flame propagation and detonation characteristics of propellants such as exemplified above by adding water or other inert liquids, or solids, directly in the propellant to act as a mechanical or physical inhibitor. A chemical inhibitor does not act to reduce the flame temperature of a propellant in which it is mixed. A mechanical or physical inhibitor acts by absorbing heat through volatilization or by offering mechanical interference to the combustion of the fuel and oxidant. Water and like inhibitors are not in general miscible with propellants of the kind indicated and thus it is frequently preferable to make a stable emulsion of all the ingredients of the propellant. The advantage of this is that the propellant ingredients do not tend to separate out.

It has been an object of the present invention to provide a mechanically inhibited propellant which would combine within itself the requisite fuel as well as oxygen in a combined form to enable complete combustion of all the fuel to take place without need for supplying further oxygen. Another object of the invention has been to provide a propellant as indicated in which all the ingredients are made into a stable emulsion by addition of an emulsifying or dispersing agent. Other objects of the invention will become apparent from the following specification while the novel features are summarized in the claims.

A stoichiometric mixture of nitromethane and tetranitromethane burns at approximately 8000° F. This temperature is too high to be handled in prime movers of the kind contemplated by this invention. This is because the physical characteristics of their component parts are such that prime movers are not capable of withstanding temperatures of this degree. On the other hand it is desirable to burn a fuel at as high a temperature as permissible because the thermodynamic efficiency increases as the temperature of combustion is raised. There are uses for a direct mixture of tetranitromethane and nitromethane, but the present invention in one form is directed to a propellant using these materials when their flame temperature is limited to approximately 3500° F. This is the approximate flame temperature that is reached during the combustion of methane and atmospheric air.

To reduce the flame temperature as indicated above, I provide a physical or mechanical, as distinguished from a chemical, inhibitor. I have found that water may advantageously be used mechanically to impede or inhibit the combustion of the propellant and its oxidizing agent. This is due largely to the fact that water has a high heat of volatilization and a high specific heat as a result of which it acts rapidly to conduct heat away from the flame point. There is thus a consequent reduction in temperature at the point of combustion. It will be understood that other suitable chemically inert substances may be used as physical or mechanical inhibitors as long as they produce the same end result as that described above.

An ideal mixture of the components of a propellant using nitromethane would consist of the following materials in the indicated proportions by weight:

Nitromethane, 35% approximately
Tetranitromethane, 30% approximately
Water, 35% approximately While the percentages of the components in the propellant listed above illustrate one preferred form of the invention it is to be understood that the invention is not limited to this mixture. Considerable latitude in percentages is possible without departing from the scope of the disclosure. Propellants mixed in proportions by weight and falling within the bounds of the following tabulation are to be considered as part of my invention:

Nitromethane, 55.5% to 30%
Tetranitromethane, 44.5% to 25%
Inhibitor, trace to 45%

Generally speaking the less water or other inhibitor supplied to the mixture, the higher the flame temperature and accordingly the propellant will consist of the above constituents in various proportions depending upon the flame temperature that is desired. The amount of inhibitor, for example, water, required may be calculated in each case by a consideration of the desired flame temperature and the number of heat units the water can remove as it is volatilized and separated out from the other ingredients. Also, the percentages of nitromethane and tetranitromethane set out above are not critical as defining the limits of this invention. For certain uses it will be desired to alter these percentages; for instance, when part of the oxygen for combustion is supplied from an additional source such as air.

A mixture of the type set forth having the proportions of fuel and oxidizing agent given above preferably should be made into a stable emulsion. This may be done by addition to the propellant mixture of a dispersing or emulsifying agent. The result is a liquid in which the ingredients are not subject to separation. To accomplish this there should be added a small amount, preferably approximately one percent (1%) by weight of the total mixture, of a triethanolamine soap. Specifically this emulsifying agent may be triethanolamine stearate.

Such a propellant as indicated above then preferably consists of the following ingredients mixed in substantially the indicated percentages by weight if the fuel is nitromethane:

| | Per cent |
|---|---|
| Nitromethane | 35 |
| Tetranitromethane | 29 |
| Water | 35 |
| Emulsifying agent | 1 |

These proportions are illustrative and it is contemplated that the ingredients used in varying proportions as set out below also lie within the scope of this invention.

It is not intended to limit the invention to the specific proportions indicated. Reasonable ranges of percentages are considered as coming within the scope of the present invention. These ranges are dependent upon two factors. One of them is the degree of self sufficiency of the mixture of fuel and oxidizing agent with respect to oxygen from another source. Thus if air is to be supplied to the mixture in addition to the oxidizing agent, less tetranitromethane is required than otherwise would be indicated. The other factor is the degree to which it is desired to inhibit the propellant and, for example, lower its flame temperature.

Accordingly, my invention is to be construed as including the following propellants made up of ingredients mixed in the following percentages by weight:

Nitromethane, 55.5% to 29%
Tetranitromethane, 44.5% to 24%
Inhibitor, trace to 45%
Emulsifying agent, trace to 2%

From the foregoing description it will be seen that I have provided a prime mover propellant that may be self contained to any desired degree as far as fuel and oxygen are concerned and to which a mechanical or physical inhibitor has been added so that it is safe to handle with a controlled rate of combustion or flame propagation and with a controlled flame temperature. Essentially the present invention covers a fuel, a source of oxygen in combined form, a mechanical or physical inhibitor and in some cases a dispersing agent. Although the mixtures and percentages listed herein are considered the preferred forms of the invention, other mixtures and percentages that fall within the range of equivalents properly ascribed to this disclosure are a part of my invention.

It is intended that the patent shall cover, by suitable expression in the appended claims, whatever features of patentable novelty reside in the invention.

I claim:

1. A prime mover propellant containing as essential ingredients a mixture of the following ingredients in approximately the indicated percentages by weight:

Tetranitromethane, 30%
Nitromethane, 35% and the balance
Water as a mechanical inhibitor 2. A prime mover propellant containing as essential ingredients a mixture of the following ingredients in approximately the indicated percentages by weight:

Tetranitromethane, 29%
Nitromethane, 35%
A triethanolamine soap, 1% and the balance
Water as a mechanical inhibitor 3. A prime mover propellant containing as essential ingredients a mixture of the following ingredients within the indicated ranges of percentages by weight:

Nitromethane, 55.5% to 30%
Tetranitromethane, 44.5% to 25%
Water, trace to 45%

4. A prime mover propellant containing as essential ingredients a mixture of the following ingredients within the indicated ranges of percentages by weight:

Nitromethane, 55.5% to 29%
Tetranitromethane, 44.5% to 24%
Water, trace to 45%
Dispersing agent, trace to 2%

JOHN A. HANNUM.

REFERENCES CITED

The following references are of record in the file of this patent:

UNITED STATES PATENTS

| Number | Name | Date |
|---|---|---|
| 914,624 | Winand | Mar. 9, 1909 |
| 1,597,343 | Chandler | Aug. 24, 1926 |
| 2,152,196 | Kokatnur | Mar. 28, 1939 |
| 2,185,157 | Nygaard | Dec. 26, 1939 |
| 2,325,065 | Lawrence | July 27, 1943 |

FOREIGN PATENTS

| Number | Country | Date |
|---|---|---|
| 26,261 | Great Britain | of 1907 |